Mar. 13, 1923.
O. E. BECKER.
BRUSH FOR ELECTRICAL MACHINERY AND METHOD OF MAKING SAME.
FILED JUNE 4, 1919.
1,448,511.
3 SHEETS—SHEET 1.
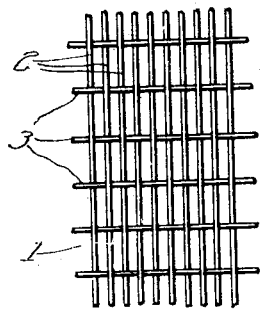
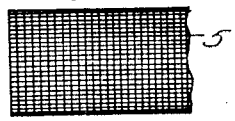
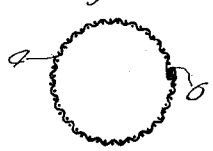
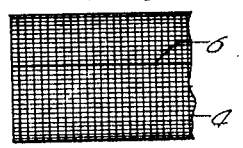
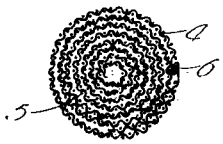
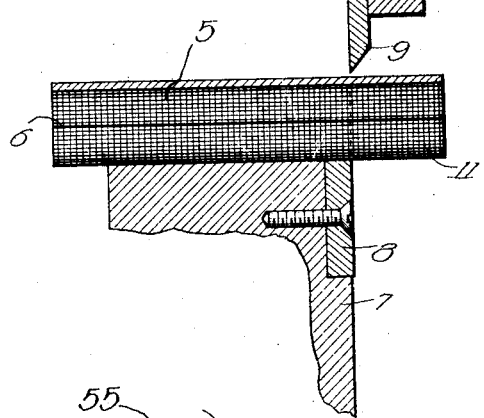
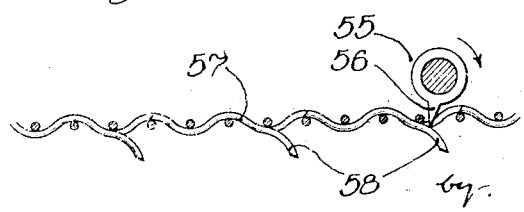
Inventor
Oliver E. Becker
by Brown Boettcher & Dienner
Attys Mar. 13, 1923. 1,448,511.
O. E. BECKER.
BRUSH FOR ELECTRICAL MACHINERY AND METHOD OF MAKING SAME.
FILED JUNE 4, 1919. 3 SHEETS—SHEET 2.
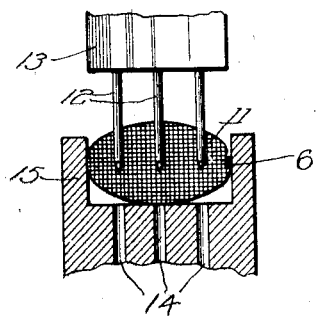
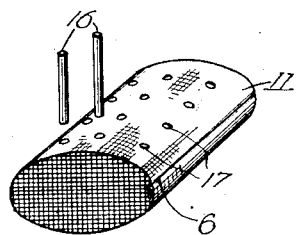
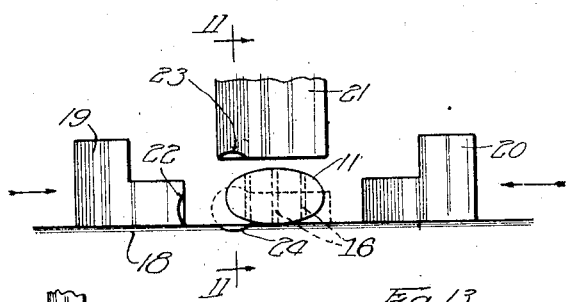
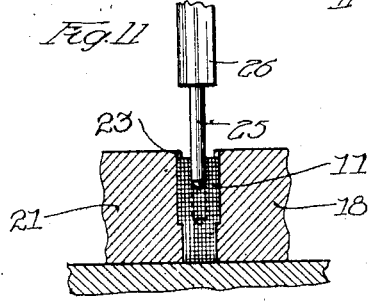
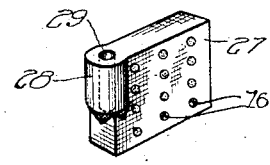
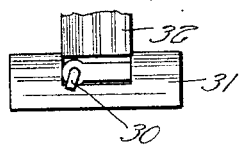
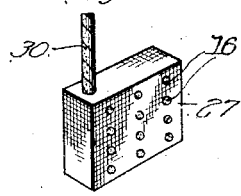
Inventor
Oliver E. Becker
by Brown Boettcher & Dunne
Attys Mar. 13, 1923.
O. E. BECKER.
BRUSH FOR ELECTRICAL MACHINERY AND METHOD OF MAKING SAME.
FILED JUNE 4, 1919.
1,448,511.
3 SHEETS—SHEET 3.

Inventor
Oliver E. Becker.
By Brown Boettcher & Dunne
Attys.

Patented Mar. 13, 1923.

1,448,511

UNITED STATES PATENT OFFICE.

OLIVER E. BECKER, OF OAK PARK, ILLINOIS, ASSIGNOR TO BECKER BROS., OF CHICAGO, ILLINOIS, A CORPORATION OF ILLINOIS.

BRUSH FOR ELECTRICAL MACHINERY AND METHOD OF MAKING SAME.

Application filed June 4, 1919. Serial No. 301,675.

*To all whom it may concern:*

Be it known that I, OLIVER E. BECKER, a citizen of the United States, residing at Oak Park, in the county of Cook and State of Illinois, have invented a certain new and useful Improvement in Brushes for Electrical Machinery and Methods of Making Same, of which the following is a full, clear, concise, and exact description, reference being had to the accompanying drawings, forming a part of this specification.

My invention relates to brushes for electrical machinery and method of making same.

The successful operation of rotating electrical machinery is dependent upon proper electrical contact being maintained between a relatively stationary terminal such as a brush and a relatively moving terminal or surface such as a commutator, collector ring or the like. Of the various types of brushes employed in this connection, those made of wire gauze, bound together and pressed into shape have been found to be the most satisfactory for certain classes of machinery and particularly for small motors, generators and the like. They provide a relatively yielding bearing or contact surface, a relatively low longitudinal resistance and a relatively high transverse resistance. They are also easy and inexpensive to manufacture and maintain.

Gauze brushes are generally made by winding a strip of wire gauze into a roll on a mandrel, then removing the mandrel and rolling or pressing the roll into shape. The rolling or pressing compresses the gauze and makes the texture close and compact; at the same time it preserves the springiness of the material to permit it to adapt itself to seating on the commutator or ring surface. In brushes of this type as heretofore constructed considerable difficulty has been experienced in obtaining a more nearly constant bearing surface and also in increasing the longitudinal conductivity of the brush without accordingly decreasing the transverse resistance of the brush and consequently increasing the short circuit current.

A further disadvantage of the prior art brushes is the tendency to spread or fray. Various expedients for preventing such spreading or fraying have destroyed or seriously impaired the resiliency and springiness or ventilation of the brush or have decreased the transverse resistance of the brush and consequently increased the heavy short circuit current thereof.

An aim of my invention is the provision of a gauze brush providing a greater and more nearly constant bearing or contact surface; the longitudinal conductivity of the brush being increased without accordingly increasing the short circuit current of the brush.

It is a further aim of my invention to provide against spreading or fraying of the brush without destroying or seriously impairing the resiliency, springiness or ventilation of the brush or decreasing the transverse resistance thereof.

A still further aim of my invention is the provision of an improved method of and means for making a novel brush embodying the above advantages; which brush may be easily and inexpensively manufactured, economically maintained and is effective in operation.

In accordance with the teachings of my invention, I provide a gauze brush, the body of which may be constructed by rolling or winding a sheet or strip of wire gauze upon a mandrel and then removing the mandrel and pressing or rolling the gauze into shape as well understood by those skilled in the art. The sheet or strip of wire gauze preferably employed is of novel formation in that a number of transverse or binding wires are interwoven or interlaced with a substantially greater number of longitudinal wires, which longitudinal wires provide the bearing or contact surface of the brush. A strip or sheet of wire gauze, the opposite edges of which are secured together as by means of a suitable lap joint is then provided about the body of the brush, forming a wrapper or sleeve thereabout. The fabric providing the body of the brush with the wrapper or sleeve thereabout is then cut into the desired lengths. These lengths of brush fabric are then perforated for the introduction of suitable localized connections, to securely connect the various layers of the brush and the wrapper or sleeve. The brush is then pressed or rolled into shape, is provided with a suitable pigtail or lead, and finished.

Other aims of my invention not hereinbefore set forth will appear from the following detailed description and the claims, taken with an inspection of the accompanying drawings, in which:

Figure 1 is an enlarged fragmentary elevational view of the wire gauze material of which my improved brush is formed;

Figure 2 is an end view of the roll of gauze prior to the provision of the wire gauze sleeve or wrapper thereabout;

Figure 3 is a side elevational view of the same;

Figure 4 is an end view of the wire gauze sleeve or wrapper;

Figure 5 is a side elevational view of the same;

Figure 6 is an end view of the roll of gauze subsequent to the provision of the wire gauze sleeve or wrapper thereabout;

Figure 7 illustrates the step of cutting the roll of brush fabric shown in Figure 6 into rolls of the desired length;

Figure 8 illustrates the step of perforating these rolls;

Figure 9 is a perspective view of the perforated gauze roll prior to the application of the localized binding fillings therein;

Figure 10 is a diagrammatic plan view showing the dies for compressing the brush fabric into rectangular, prismatic form with an enlargement at one end;

Figure 11 is a vertical section taken substantially on the line 11—11 of Figure 10 showing the spreading punch for forming a hole in the enlargement;

Figure 12 is an elevational view of the finishing die mechanism;

Figure 13 illustrates the brush fabric as compressed into rectangular prismatic form with the hole and enlargement formed at one end; and Figure 14 is a perspective view of the brush subsequent to the insertion of the pigtail or lead therein;

Figure 17 illustrates an alternative manner of binding the various layers of brush fabric securely together.

Figure 15:
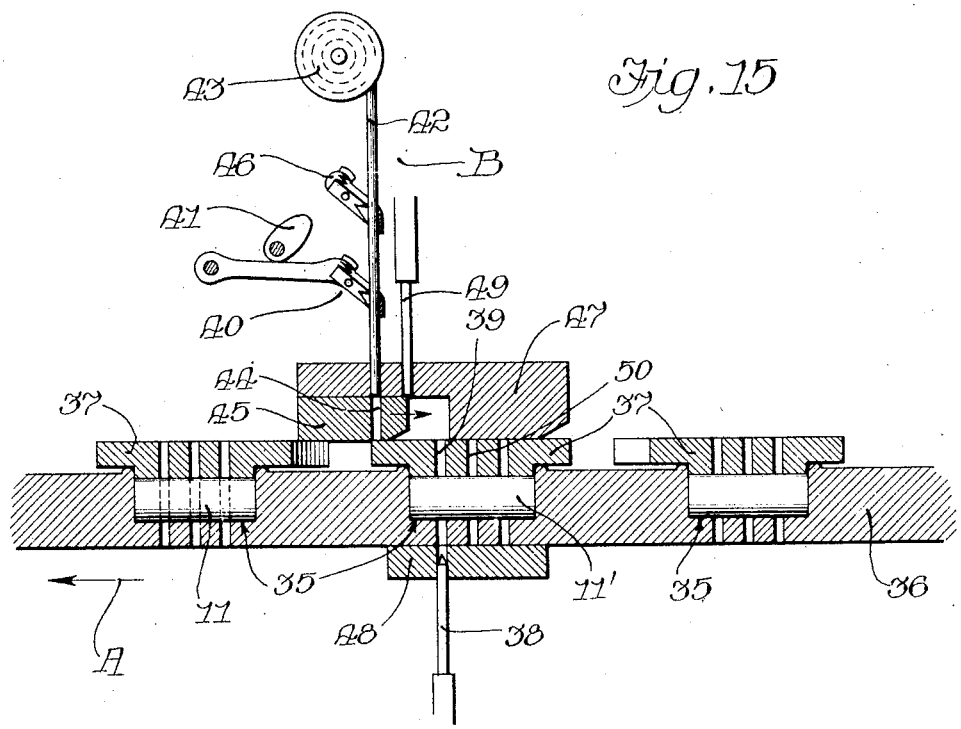
Figures 15 and 16 show diagrammatically an illustrative mechanism for automatically perforating the rolls of brush fabric and inserting the holding rivets therein.

The first step in forming a brush in accordance with the teachings of my invention is to form the wire gauze fabric 1 (Figure 1) into a roll of gauze such as shown in Figures 2 and 3. This is preferably accomplished by rolling the wire gauze fabric 1 upon a suitable mandrel until a roll of the desired size has been formed and then removing the mandrel. I do not consider that it is necessary to describe this feature in detail, as the same is old and will be well understood by those skilled in the art.

As shown in Figure 1 the wire gauze fabric 1 which forms the body of the brush, is of novel formation in that the number of longitudinal wires 2 is substantially greater than the number of transverse or binding wires 3 interwoven or interlaced therewith. As will hereinafter be apparent, the longitudinal wires 2 form the bearing or contact surface of the brush; the transverse or binding wires 3 serving to bind the longitudinal wires 2 together and against fraying or otherwise spreading.

In rolling the fabric 1 upon the mandrel the transverse or binding wires 3 of the fabric are wound circumferentially about the mandrel, the longitudinal wires 2 lying substantially parallel with the axis of the mandrel.

A gauze sleeve or wrapper 4 is arranged about the gauze roll 5, thus provided, tightly encompassing this gauze roll, as shown in Figure 6. This sleeve or wrapper 4 not only binds the numerous layers of the gauze roll 5 securely together during the subsequent steps in the formation of the brush, but very effectively counteracts—without impairing the resiliency or springiness of the brush—any tendency of the brush to spread or fray after completion.

As shown in Figures 4 and 5 the gauze wrapper 4 is formed of a strip or sheet of wire gauze rolled to form a cylindrical sleeve, the adjacent longitudinal edges of which cylindrical sleeve are united by means of a lap joint 6. The gauze of which the wrapper is formed may be of any preferred texture, and need not be of the same character as the body of the brush.

The roll of gauze brush fabric 5 encompassed and securely bound together by the gauze sleeve or wrapper 4 is then arranged upon the bed plate 7 of the cutting die mechanism, substantially as shown in Figure 7, projecting beyond the edge 8 of the bed plate 7 according to the desired length of the rolls into which the fabric is to be cut. The cutting blade 9, carried by the upper cutting die 10 engages the roll of gauze fabric and in co-operation with the relatively stationary edge 8, cuts the fabric into rolls 11 of the desired length, preferably slightly longer than the finished length of the brush. The roll of fabric 5 can be advanced over the bed plate 7 into position to be cut upon the downward movement of the upper cutting die 10 either manually or automatically as desired.

These rolls 11 having been cut to the desired length are then placed in the die mechanism shown in Figure 8 and are there perforated transversely upon the downward movement of the upper die member 13 by the co-operation of a plurality of perforating pins or punches 12 carried by the upper die member 13 with a plurality of apertures 14 provided in the lower relatively stationary die member 15. The roll may be given a preliminary shaping operation before placing in the die mechanism shown in Figure 8 or it may be placed in this die mechanism in the rough.

As shown in Figure 9, pegs 16 of soft or malleable material such as solder or the like are then inserted in the transverse perforations 17 formed by means of the die mechanism shown in Figure 8. Thus by the pressure applied to the roll in the subsequent steps of shaping and finishing the brush, a series of localized connections are provided between the various layers of the gauze roll and the gauze wrapper. These localized connections may be considered in the nature of rivets of solder. The pins 16 are distorted and deformed by the pressure of the dies so that they serve very effectively as holding rivets. Heat might be applied but I have found that it is not necessary to secure a union of the layers of gauze and the pins 16.

Figure 16:
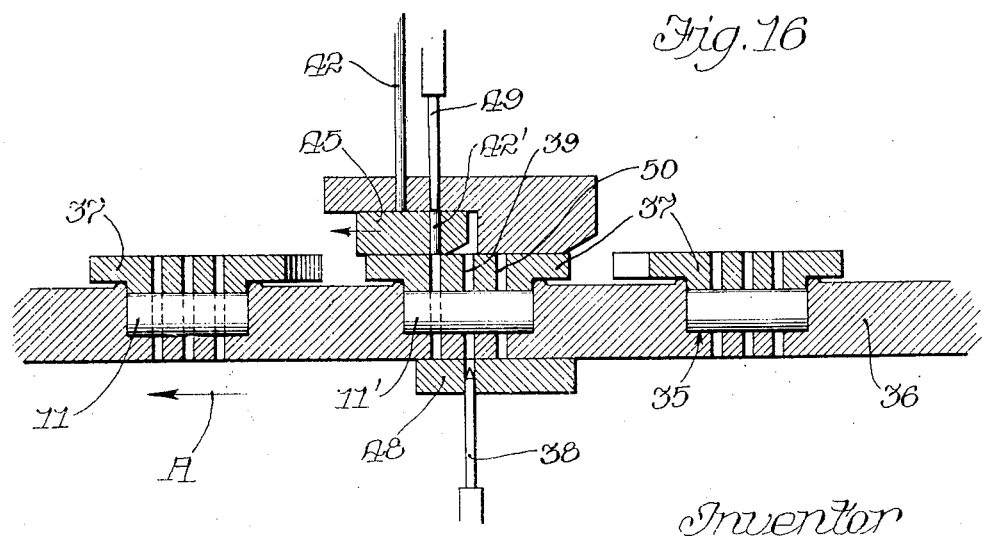

The steps just described in connection with Figures 8 and 9, namely perforating the rolls of brush fabric and inserting the holding rivets therein, may be accomplished automatically if so desired. In Figures 15 and 16 I have shown diagrammatically an illustrative mechanism for automatically perforating the rolls of brush fabric and inserting the holding rivets therein.

In this case the rolls 11 having been cut to the desired length are placed in the pockets or compartments 35 provided in the upper surface of the annular carrying or advancing plate 36 and the perforated aligning blocks 37 are arranged in place substantially as shown. The pockets 35 are spaced around the periphery of the plate 36 equidistantly apart. The plate 36 is revolved by means of suitable step by step advancing mechanism in the direction indicated by the arrow A in order to bring the rolls 11 successively beneath the perforating and peg feeding mechanism B. The particular mechanism for imparting a step by step advancing motion to the plate 36 is immaterial in so far as my invention is concerned and has been omitted for the sake of clearness.

In Figure 16 the roll of brush fabric 11 has been perforated, holding rivets inserted therein and the roll 11' advanced into position to be perforated by the co-operation of a row of perforating pins or punches 38 with the first row of apertures 39 provided in the aligning block 37. As the roll 11' is operated upon to produce the first row of perforations therein, the feeding pawl 40 is actuated as by means of a cam 41 to feed solder wire 42 from a roll 43 into a row of apertures 44 provided in the plunger block 45. Suitable mechanism is provided for alternately moving the plunger block 45 from the position shown in Figure 15 to the position shown in Figure 16 and back. Upon being fed into the plunger block 45 the solder wire 42 is held in place by means of a suitable holding pawl 46.

Upon feeding the wire 42 into the apertures 44 the plunger block 45 is moved into the position shown in Figure 16 shearing off the wire by the co-operation of the plunger or shearing block 45 with the relatively stationary block 47. The perforating pins or punches 38 having been withdrawn into the relatively stationary block 48, the plate 36 is advanced to the position shown in Figure 16, bringing the first row of perforations provided in the roll 11' into alignment with the row of apertures 44 provided in the plunger block 45.

As perforating the brush body tends to distort the same to a slight extent, I have found it to be preferable to insert the holding pegs into the first row of perforations before operating upon the brush body to produce a second row of perforations. In accordance with this the punches 49 are then actuated, forcing the pegs 42' from the plunger block 45 thru the aligning block 37 and into the first row of apertures or perforations provided in the roll 11'.

The plunger block 45 is then returned to the position shown in Figure 15 to again receive wire from the roll 42 and a second row of perforations is produced in the roll 11' by the co-operation of the perforating pins or punches 38 with the second row of apertures 49 provided in the aligning block 37. The perforating punches 38 are then withdrawn into the relatively stationary block 48, the wire 42 fed into the plunger block 45 and the plunger block moved into the position shown in Figure 16, whereupon the carrying plate 36 is advanced and the pegs 42' forced into the second row of perforations substantially as has been described.

It is to be understood that the particular mechanism and arrangement of parts shown is merely illustrative. The particular contour of the plate 36 is immaterial in that this plate might be advanced forwardly instead of revolved if so desired.

In Figure 17 I have illustrated an alternative manner of binding the various layers of brush fabric securely together.

In this instance the wire gauze fabric is operated upon by a rotating member 55 provided with a prong 56 projecting outwardly from the periphery thereof. The prong 56 is adapted upon rotation of the member 55 to cut the wires 57 of the gauze fabric at spaced intervals and to bend these cut ends down out of alignment with the brush fabric as shown at 58. The wire gauze fabric with the cut wires 58 projecting therefrom is then formed into a roll of gauze such as is shown in Figures 2 and 3 the outstanding wires 58 interlacing with the various layers of gauze to connect the layers securely together. The binding effect of the wires 58 is further increased by the subsequent steps of shaping and finishing the brush.

The gauze roll 11, the various layers of which are interconnected, is then placed against the back plate member 18 of the die mechanism shown in Figures 10 and 11 and is there brought to form and punched for the attachment of a suitable lead, substantially as set out in my prior Patent No. 1,288,474, dated December 24, 1918. A pair of co-operating die members 19 and 20 movable toward each other, are adapted to move in and press upon the opposite longitudinal sides of the roll 11. A die member 21, movable at right angles to the die members 19 and 20, is adapted to co-operate with the back plate member 18 to press upon the other longitudinal faces of the roll 11.

It will be noted that the die members 19 and 21 and the back plate member 18 have recesses 22, 23 and 24 formed therein, so that the roll of gauze 11 may be spread into the same to form an enlargement. This is for the purpose of permitting the gauze to be spread to form a hole in the same for attaching the lead, as will be described later. Suitable end dies (not shown) engage the opposite transverse ends of the roll to compress the same into substantially finished shape and size with the exception of the enlargement formed in the recesses 22, 23 and 24 of the adjacent die members. Thereafter the roll 11 is operated upon by a spreading punch 25 (Figure 11) which consists of a pointed pin mounted in a vertically movable head member 26.

The roll 11 is thus transformed into the formed brush body 27 (Figure 13) which has an enlargement 28 to receive the metal of the gauze which is spread apart or moved laterally by the formation of the hole 29. It is to be noted that the opening 29 extends only a short distance down into the body of the brush and the enlargement 28 also extends down only a short way. Thereafter, the stranded lead or pigtail 30 is inserted in the opening 29 and the body of the brush, with the pigtail or lead 30 in place, is then placed in a suitable closing die 31 and is pressed by a co-operating punch 32 to compress the material of the body of the brush upon the lead 30, at the same time forming the brush to finished size.

The wire gauze fabric 1 (Figure 1) may be plain gauze or lubricated gauze of the character set out in patent to Schweitzer Number 1,228,484.

I do not intend to be limited to the precise details of construction shown or described and I intend that modifications in the order of practicing the various steps such as will be apparent at once to those skilled in the art are contemplated within the scope of the appended claims.

I claim:

1. A gauze brush formed of layers of metallic gauze having a sleeve or wrapper arranged thereabout for holding the layers of gauze against spreading, and pins having deformed body portions projecting thru the sleeve or wrapper into the several layers.

2. A brush of the character described comprising a roll of metallic gauze encased in a binding wrapper of metallic gauze, said binding wrapper comprising a gauze sleeve arranged about the brush with its adjacent edges crimped together and pressed into the body of the brush.

3. A brush of the character described comprising layers of metallic gauze, a gauze wrapper arranged thereabout said wrapper comprising a gauze sleeve encircling the layers of metallic gauze and having its adjacent edges connected together, and local connectors deformed to interlock with said individual layers to retain the connectors and layers in assembled relation.

4. A gauze brush formed of layers of metallic gauze having connecting pins provided with deformed body portions arranged transversely therethru for holding the layers of gauze against spreading.

5. A gauze brush formed of layers of metallic gauze, a gauze wrapper arranged thereabout and local distorted or irregular connections between said layers of metallic gauze and said wrapper.

6. A gauze brush formed of layers of metallic gauze having bodily deformed pins arranged therethru, the number of longitudinal contact making wires of the brush body being substantially greater than the number of transverse binding wires.

7. In the method of forming a gauze brush, the combination of the following steps: forming a sheet of gauze into a roll, cutting the roll into lengths of slightly greater length than the length of the finished brush, perforating these rolls transversely, inserting metallic pins in the perforations and crushing the metallic pins by pressure.

8. In the method of forming a gauze brush, the combination of the following steps: forming a sheet of metallic gauze into a roll, cutting the roll into lengths and perforating these lengths of gauze roll for the reception of suitable connecting pins for binding the layers of gauze against spreading.

9. In the method of forming a gauze brush, the combination of the following steps: forming the gauze fabric into a roll, cutting the roll into lengths of slightly greater length than the length of the finished brush and then forming the brush to finished size by pressure.

10. The method of connecting the layers of a gauze brush which consists in perforating the gauze brush, inserting pins of metal in the perforations, and thereafter pressing the brush to the desired shape.

11. The method of preventing bowing or spreading of gauze brushes which consists in providing a gauze wrapper about the gauze body of the brush, perforating the gauze body and the wrapper, inserting local connection fillings in the perforations to connect the layers of the brush body and the gauze wrapper and then pressing the brush to the desired shape.

12. The method of binding the layers of a gauze brush together which consists in severing various wires of the gauze fabric, bending the severed ends of said wires out of the normal plane of said fabric and forming said gauze fabric into a roll, whereupon said severed ends will interlace with the various layers of the brush body to connect said layers together.

13. A gauze brush formed of layers of metallic gauze provided with a plurality of barbs for holding the layers of gauze against spreading.

14. The method of forming brushes which includes forming a roll of metallic gauze, enclosing the roll in a wrapper comprising a sleeve of gauze arranged about the roll and having its adjacent edges connected together, and then flattening the enclosed roll to tension the wrapper.

15. The method of forming brushes which includes assembling layers of metallic gauze in superimposed relation, inserting connecting members therethrough, and then compressing said layers of metallic gauze and members to cause said members to interlock with the individual layers.

16. The method of forming brushes which includes forming a roll of metallic gauze, enclosing the roll in a suitable wrapper, inserting connectors in the roll, and then pressing the brush to the desired shape and thus cause a deformation of the connectors.

17. The method of forming a gauze brush or the like, which consists of the following steps; forming a sheet of gauze into a roll, cutting the roll into lengths, arranging these lengths of gauze roll upon a carrying member, moving said carrying member to bring said lengths successively into cooperative position with a perforating and pin feeding mechanism, actuating said mechanism to perforate said lengths of gauze and automatically insert connecting pegs into said perforations and then shaping said brush to finish the same.

In witness whereof, I hereunto subscribe my name this 28th day of April, A. D. 1919.

OLIVER E. BECKER.